United States Patent
Shih et al.

(10) Patent No.: US 10,458,859 B2
(45) Date of Patent: Oct. 29, 2019

(54) TEMPERATURE DETECTION DEVICE

(71) Applicant: Young Optics Inc., Hsinchu Science Park (TW)

(72) Inventors: Chih-Yung Shih, Hsinchu Science Park (TW); Jia-Bin Huang, Hsinchu Science Park (TW); Wen-Hsin Hsu, Hsinchu Science Park (TW)

(73) Assignee: YOUNG OPTICS INC., Hsinchu (TW)

( * ) Notice: Subject to any disclaimer, the term of this patent is extended or adjusted under 35 U.S.C. 154(b) by 221 days.

(21) Appl. No.: 15/490,460

(22) Filed: Apr. 18, 2017

(65) Prior Publication Data

US 2018/0073937 A1   Mar. 15, 2018

(30) Foreign Application Priority Data

Sep. 12, 2016   (TW) .............................. 105129547 A

(51) Int. Cl.
| | | |
|---|---|---|
| *G01K 1/00* | (2006.01) | |
| *G01K 7/00* | (2006.01) | |
| *G01K 7/24* | (2006.01) | |
| *G01K 1/16* | (2006.01) | |
| *F21V 19/00* | (2006.01) | |
| *F21Y 115/10* | (2016.01) | |

(52) U.S. Cl.
CPC .............. *G01K 7/24* (2013.01); *F21V 19/003* (2013.01); *G01K 1/16* (2013.01); *F21Y 2115/10* (2016.08)

(58) Field of Classification Search
USPC .......................... 374/100, 141, 163, 208, 178
See application file for complete search history.

(56) References Cited

U.S. PATENT DOCUMENTS

| | | | |
|---|---|---|---|
| 9,261,412 B2 | 2/2016 | Yoshida et al. | |
| 9,316,546 B2 | 4/2016 | Tsubaki et al. | |
| 2010/0052542 A1* | 3/2010 | Siemiet | G01J 1/32 315/129 |
| 2012/0188287 A1* | 7/2012 | Wurzel | G06F 1/203 345/690 |
| 2015/0102748 A1* | 4/2015 | Lee | H05B 33/0854 315/297 |
| 2016/0209277 A1 | 7/2016 | Motooka et al. | |

* cited by examiner

*Primary Examiner* — Mirellys Jagan
(74) *Attorney, Agent, or Firm* — Muncy, Geissler, Olds & Lowe, P.C.

(57) ABSTRACT

A temperature detection device includes a circuit board, a temperature sensor, and at least one signal transmission line. The temperature sensor is disposed on the circuit board and overlapped with a light source module, and the temperature sensor and the light source module forms a heat conduction path. The signal transmission line is connected to the circuit board to output a sensing signal of the temperature sensor.

18 Claims, 4 Drawing Sheets

TEMPERATURE DETECTION DEVICE

BACKGROUND OF THE INVENTION a. Field of the Invention

The invention relates to a temperature detection device.

b. Description of the Related Art

Nowadays, an LED module may be equipped with a built-in thermistor to detect the temperature of a light source. However, a designer seldom adds the built-in thermistor in the LED module, because it may increase the overall fabrication costs. In that case, a user fails to timely notice current operating temperature of an LED module.

Therefore, it is desirable to provide an external temperature detection device having a simplified structure and high reliability to resolve the above problem.

BRIEF SUMMARY OF THE INVENTION

According to one aspect of the present disclosure, a temperature detection device includes a circuit board, a temperature sensor, and at least one signal transmission line. The temperature sensor is disposed on the circuit board and overlapped with a light source module, and the temperature sensor and the light source module forms a heat conduction path. The signal transmission line is connected to the circuit board to output a sensing signal of the temperature sensor.

According to another aspect of the present disclosure, a temperature detection device includes a circuit board, a temperature sensor, and at least one signal transmission line. The temperature sensor is disposed on the circuit board and overlapped with a light source module, and the circuit board has at least one pad and at least one trace connected between the pad and the temperature sensor. The signal transmission line is connected to the circuit board through the pad to output a sensing signal of the temperature sensor to a signal processing circuit.

The above embodiments may provide a simplified and reliable temperature detection device. When the temperature detection device is installed on a light source module, a working temperature of the light source module can be quickly detected to ease temperature measurements and achieve monitoring temperature variations. Further, an external temperature detection device external to an electronic device having a light source module is potentially not to interfere with an arrangement of components inside the electronic device. Besides, in one embodiment, the design of a combination of a flexible circuit board and a rigid printed circuit board and a protective coating applied on a temperature sensor may reinforce structure strength and reliability to avoid external damages and inaccurate temperature detection.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "front," "back," etc., is used with reference to the orientation of the Figure(s) being described instead of limiting the scope of the present invention.

Figure 1:
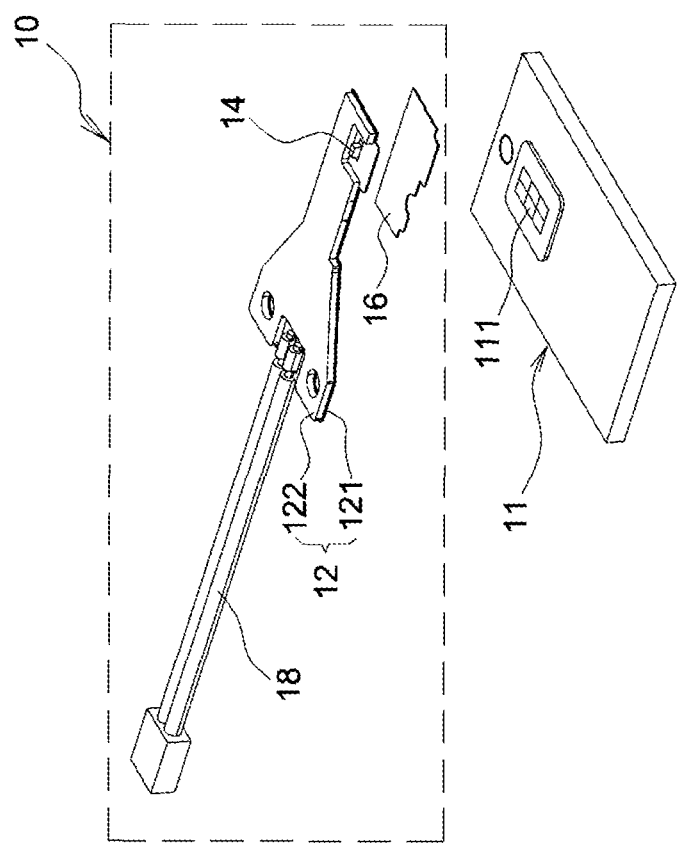
FIG. 1 shows a schematic diagram of a temperature detection device according to an embodiment of the invention.

FIG. 1 shows a schematic diagram of a temperature detection device according to an embodiment of the invention. As shown in FIG. 1, the temperature detection device 10 includes a circuit board assembly 12, a temperature sensor 14, a heat conductive medium 16 and at least one signal transmission line 18. The temperature detection device 10 may be used to detect a temperature of a light source of an electronic device, and the light source to be measured for temperature is not limited to a specific type. In this embodiment, the temperature detection device 10 may detect a temperature of an LED module, and the temperature sensor 14 may be, for example, disposed on and overlapped with an LED die 111 of the LED module 11 to detect the temperature. In an alternate embodiment, the light source may include a laser diode. Note the temperature sensor 14 needs not to be disposed in a specific position on a light source to detect the temperature of the light source, and the detection position may vary according to actual demands, component layouts, or any other factor. In other embodiment, the temperature sensor 14 may be disposed to overlap the LED module 11 and near the LED die 111. In this embodiment, the circuit board assembly 12 may include a flexible printed circuit board 121 and a rigid printed circuit board 122, and the temperature sensor 14 may be disposed on the flexible printed circuit board 121. The rigid printed circuit board 122 may be, for example, attached to the one side of the flexible printed circuit board 121 facing away from the LED module 11. The rigid printed circuit board 122 may be used to enhance the rigidity of the overall circuit board assembly 12. Note the flexible printed circuit board 121 and the rigid printed circuit board 122 can be formed from any suitable material. For example, the flexible printed circuit board 121 may include a polyimide substrate, and the rigid printed circuit board 122 may include a bakelite substrate or a fiber glass substrate. Further, the heat conductive medium 16 may be disposed between the temperature sensor 14 and the LED die 111 and in contact with the temperature sensor 14 and the LED die 111. Therefore, the temperature sensor 14, the heat conductive medium 16 and the LED die 111 may form a heat conduction path to allow the temperature sensor 14 to accurately detect the temperature of the LED die 111. The signal transmission line 18 connected to the flexible printed circuit board 121 may output a sensing signal of the temperature sensor 14 to a signal processing circuit (not shown) to convert the sensing signal into a corresponding temperature value. In one embodiment, the temperature sensor 14 may be, but is not limited to, a thermistor. In case the temperature sensor 14 is a thermistor, the sensing signal of the temperature sensor 14 may be a resistance signal that can be converted into a corresponding temperature value. In other embodiment, the temperature sensor 14 may detect sensing signals in the form of voltages or currents and convert the sensing signals into corresponding temperature values. Further, the heat conductive medium 16 can be formed from any suitable material. In one embodiment, the heat conductive medium 16 may be a thermally conductive adhesive having high heat conduction capabilities. Besides, in one embodiment, the heat conductive medium 16 may also serve the function of fixing components or protecting the temperature sensor. Further, in one embodiment, the temperature sensor 14 may be coated with an adhesive for protection.

The above embodiments provide a simplified and reliable temperature detection device. When the temperature detection device is installed on a light source module, a working temperature of the light source module can be quickly detected to ease temperature measurements and achieve monitoring temperature variations. Further, an external temperature detection device external to an electronic device having a light source module is potentially not to interfere with an arrangement of components inside the electronic device. Besides, in one embodiment, the design of a combination of a flexible circuit board and a rigid printed circuit board and a protective coating applied on a temperature sensor may reinforce structure strength and reliability to avoid external damages and inaccurate temperature detection.

Figure 2:
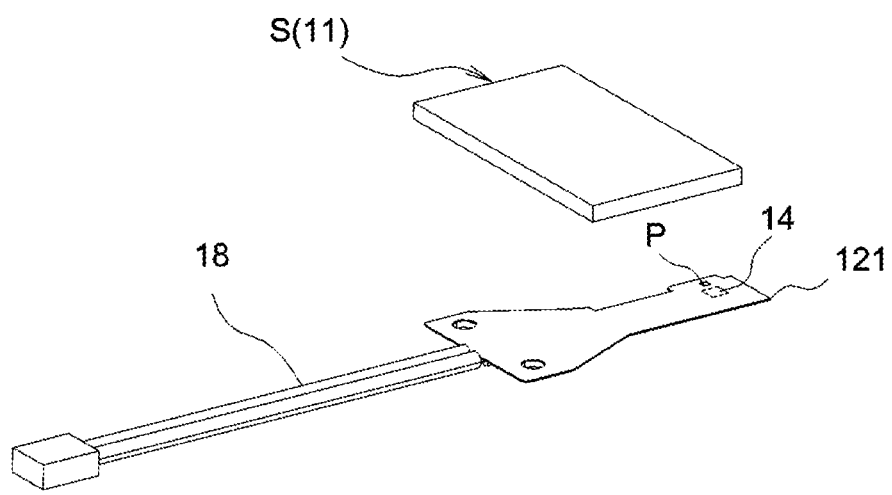
FIG. 2 shows a schematic diagram of a temperature detection device according to another embodiment of the invention.

FIG. 2 shows a schematic diagram of a temperature detection device according to another embodiment of the invention. As shown in FIG. 2, the heat conductive medium 16 shown in FIG. 1 is omitted from the temperature detection device 20. When the temperature sensor 14 is disposed on a light source S such as the LED module 11, the temperature sensor 14 touches the light source S and is together with the light source S to form a heat conduction path to detect the temperature of the light source S. In this embodiment, the temperature detection device 20 may use only the flexible printed circuit board 121 without the use of an additional rigid printed circuit board. Further, at least one exposed metal point P is provided on the flexible printed circuit board 121 at one side facing the light source S, and the exposed metal point P and the light source S may form a part of the heat conduction path to enhance heat dissipation efficiency.

Figure 3:
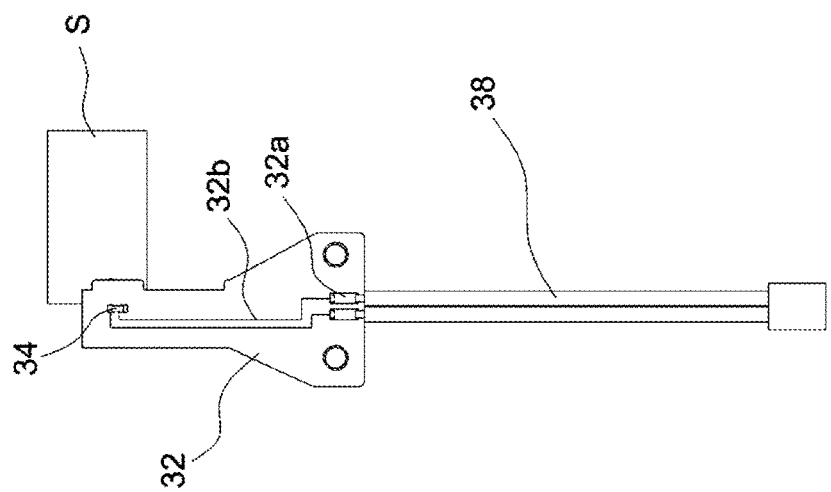
FIG. 3 shows a wiring structure of a temperature detection device according to an embodiment of the invention.
Figure 4:
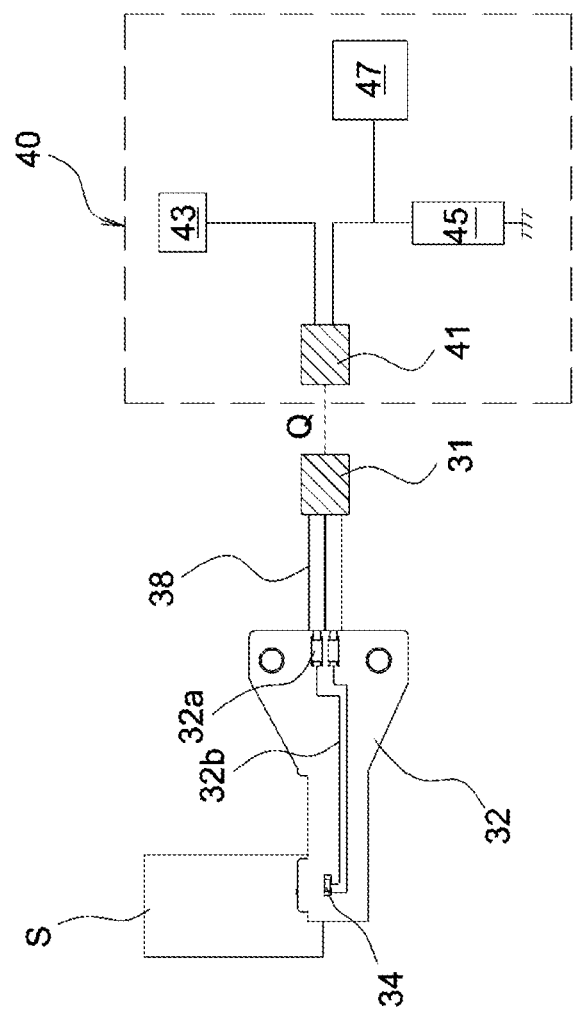
FIG. 4 shows a schematic diagram illustrating the signal processing architecture of a temperature detection device according to an embodiment of the invention.

FIG. 3 shows a wiring structure of a temperature detection device according to an embodiment of the invention. As shown in FIG. 3, the temperature detection device 30 includes a circuit board 32, a temperature sensor 34 and at least one signal transmission line 38. The temperature sensor 34 is disposed on the circuit board 32 and overlapped with the light source S. The circuit board 32 is provided with at least one pad 32a and at least one trace 32b connected between the pad 32a and the temperature sensor 34. The signal transmission line 38 is connected to the circuit board 32 through the pad 32a to output a sensing signal Q of the temperature sensor 34. Referring to FIG. 4, the sensing signal Q is transmitted to a signal processing circuit 40 via terminals 31 and 41 and converted into a corresponding temperature value, where the signal processing circuit 40 may, for example, include a power source 43, a resistor 45, a converter IC 47, etc.

Note, in the above embodiments, the circuit board is not limited to have a specific structure, and the temperature detection device may use only the flexible printed circuit board 121, only the rigid printed circuit board 122, or a combination of a flexible printed circuit board 121 and a rigid printed circuit board 122.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. A temperature detection device, comprising:
   a circuit board;
   a temperature sensor disposed on the circuit board and overlapped with a light source module, the temperature sensor and the light source module forming a heat conduction path;
   at least one signal transmission line connected to the circuit board to output a sensing signal of the temperature sensor; and
   a heat conductive medium disposed between the temperature sensor and a light source of the light source module and in contact with the temperature sensor and the light source.

2. The temperature detection device as claimed in claim 1, wherein the heat conductive medium is a thermally conductive adhesive.

3. The temperature detection device as claimed in claim 1, wherein the light source module is an LED module, and the temperature sensor is a thermistor.

4. The temperature detection device as claimed in claim 1, wherein the circuit board has at least one exposed metal point provided on one side of the circuit board facing a light source of the light source module, and the exposed metal point and the light source form a part of the heat conduction path.

5. The temperature detection device as claimed in claim 1, wherein the circuit board is a flexible printed circuit board.

6. The temperature detection device as claimed in claim 5, further comprising:
   a rigid printed circuit board attached to one side of the flexible printed circuit board.

7. The temperature detection device as claimed in claim 6, wherein the flexible printed circuit board comprises a polyimide substrate.

8. The temperature detection device as claimed in claim 6, wherein the rigid printed circuit board comprises a bakelite substrate or a fiber glass substrate.

9. The temperature detection device as claimed in claim 1, wherein the circuit board has at least one pad and at least one trace connected between the pad and the temperature sensor, and the signal transmission line is connected to the circuit board through the pad.

10. The temperature detection device as claimed in claim 9, wherein the heat conductive medium is a thermally conductive adhesive.

11. The temperature detection device as claimed in claim 9, wherein the light source module is an LED module, and the temperature sensor is a thermistor.

12. The temperature detection device as claimed in claim 9, wherein the circuit board has at least one exposed metal point provided on one side of the circuit board facing a light source of the light source module, and the exposed metal point and the light source forms a part of the heat conduction path.

13. The temperature detection device as claimed in claim 9, wherein the circuit board is a flexible printed circuit board.

14. The temperature detection device as claimed in claim 13, further comprising:
   a rigid printed circuit board attached to one side of the flexible printed circuit board.

15. The temperature detection device as claimed in claim 14, wherein the flexible printed circuit board comprises a polyimide substrate.

16. The temperature detection device as claimed in claim 14, wherein the rigid printed circuit board comprises a bakelite substrate or a fiber glass substrate.

17. A temperature detection device for detecting a temperature of an LED die, the temperature detection device comprising:
   a flexible printed circuit board;
   a thermistor disposed on the flexible printed circuit board and overlapped with the LED die;
   a heat conductive medium disposed between the thermistor and the LED die and in contact with the thermistor and the LED die, and the thermistor, the heat conductive medium and the LED die forming a heat conduction path;
   at least one signal transmission line connected to the flexible printed circuit board, the signal transmission line outputting a resistance signal of the thermistor to a signal processing circuit to convert the resistance signal into a corresponding temperature value; and
   a rigid printed circuit board attached to one side of the flexible printed circuit board.

18. The temperature detection device as claimed in claim 17, wherein the flexible printed circuit board comprises a polyimide substrate, and the rigid printed circuit board comprises a bakelite substrate or a fiber glass substrate.

* * * * *